(12) United States Patent
Büchler et al.

(10) Patent No.: US 6,781,948 B2
(45) Date of Patent: Aug. 24, 2004

(54) DEVICE FOR READING FROM AND/OR WRITING TO OPTICAL RECORDING MEDIA

(75) Inventors: Christian Büchler, Villingen-Schwenningen (DE); Lieu-Kim Dang, Villingen-Schwenningen (DE); Friedhelm Zucker, Villingen-Schwenningen (DE)

(73) Assignee: Deutsche Thomson-Brandt GmbH, Villingen-Schwenningen (DE)

( * ) Notice: Subject to any disclaimer, the term of this patent is extended or adjusted under 35 U.S.C. 154(b) by 0 days.

(21) Appl. No.: 09/969,171

(22) Filed: Oct. 2, 2001

(65) Prior Publication Data

US 2002/0009041 A1 Jan. 24, 2002

Related U.S. Application Data

(63) Continuation of application No. 09/252,525, filed on Feb. 18, 1999, now abandoned.

(30) Foreign Application Priority Data

Feb. 26, 1998  (DE) .......................................... 198 07 809

(51) Int. Cl.[7] ................................................ G11B 7/00
(52) U.S. Cl. .................................... 369/120; 369/44.41
(58) Field of Search ............................ 369/44.41, 120; 366/245.9

(56) References Cited

U.S. PATENT DOCUMENTS

| | | | | |
|---|---|---|---|---|
| 4,559,550 A | * | 12/1985 | Koike et al. ................. 357/24 |
| 4,853,923 A | * | 8/1989 | Yamada et al. ............. 369/120 |
| 5,016,043 A | * | 5/1991 | Kraft et al. .................. 355/38 |
| 5,097,458 A | * | 3/1992 | Suzuki |
| 5,299,013 A | * | 3/1994 | Wang et al. ................. 348/307 |
| 5,394,385 A | * | 2/1995 | Sakurada et al. ........ 369/44.23 |
| 5,627,805 A | * | 5/1997 | Finkelstein et al. |
| 5,802,025 A | * | 9/1998 | Suni ........................ 369/44.41 |
| 5,838,519 A | * | 11/1998 | Takizawa et al. |
| 5,963,523 A | * | 10/1999 | Kayama et al. .......... 369/53.22 |
| 5,974,231 A | * | 10/1999 | Arakawa et al. ............ 395/109 |
| 6,069,862 A | * | 5/2000 | Fujita et al. ................. 369/112 |
| 6,424,605 B1 | * | 7/2002 | Iida ........................ 369/44.27 |

FOREIGN PATENT DOCUMENTS

| | | | |
|---|---|---|---|
| EP | 0800168 A2 | * | 10/1997 |
| JP | 6-215530 | * | 5/1994 |
| JP | 07-153279 | * | 6/1995 ........... G11C/15/04 |

* cited by examiner

*Primary Examiner*—Aristotelis M. Psitos
(74) *Attorney, Agent, or Firm*—Joseph S. Tripoli; Carlos M. Herrera; Patricia A. Verlangieri

(57) ABSTRACT

The present invention relates to a device for reading from and/or writing to optical recording media having a scanning unit, which is equipped with at least two detector units each having a plurality of detector elements, and also an evaluation unit, each of the detector elements being connected to the evaluation unit by means of a line.

The object of the present invention is to simplify the structure of a device of this type.

This object is achieved by virtue of the fact that detector elements of different detector units are each connected to the evaluation unit via a single line.

The device according to the invention is advantageously a device which can read from and/or write to not only optical recording media which correspond to a CD standard but also those which correspond to a DVD standard.

9 Claims, 1 Drawing Sheet

DEVICE FOR READING FROM AND/OR WRITING TO OPTICAL RECORDING MEDIA

PRIORITY INFORMATION

The benefit is claimed of the filing date of U.S. application Ser. No. 09/252,525 filed Feb. 18, 1999 (now abandoned) and of German application No. 198 07 809.9 filed Feb. 26, 1998.

CROSS REFERENCE TO RELATED APPLICATIONS

This is a continuation of application Ser. No. 09/252,525 filed Feb. 18, 1999, now abandoned.

FIELD OF THE INVENTION

The present invention relates to a device for reading from and/or writing to optical recording media which has a scanning unit with at least two detector units.

BACKGROUND OF THE INVENTION

Devices of this type are employed for example when different types of optical recording media are used, to which the respective detector unit is adapted.

SUMMARY OF THE INVENTION

The object of the present invention is to simplify the structure of a device of this type.

This object is achieved by means of the features specified in independent claims; advantageous refinements of the invention are specified in the dependent claims.

The invention provides for detector elements of different detector units each to be connected to an evaluation unit via a single, common line. This has the advantage that the number of lines required between scanning unit and evaluation unit is reduced. If the evaluation unit has two detector units, then it is possible to halve the number of lines required. In the case of three or more detector units, a reduction to a third or less is possible. A further advantage consists in the fact that the number of connection possibilities, the so-called pins, on detector unit and evaluation unit is also correspondingly reduced. Since the space requirement of an integrated circuit is often essentially determined by the number of its connection pins, the invention advantageously enables a size reduction. The scanning unit has two or more detector units in order to be able to read from and/or write to, for example, two or more different types of optical recording media whose optical properties differ from one another in such a way that it is necessary or at least practical to read them by way of differently designed detector units. Even in the case of a single type of recording medium, it may be practical to use different detector units for reading and/or writing, in order, for example, to take account of the different reflection properties of the optical recording medium during the writing operation and the reading operation. In the case of the writing operation, too, a detector unit is required in order to be able to operate regulating circuits, such as track or focus regulating circuit, if appropriate also in order to check the recording directly. The evaluation unit serves to condition the signals received from the detector elements, for example pre-amplification, logic combination of individual signals or the like. The evaluation unit either itself serves to generate error signals such as track error signal, focus error signal, tilt error signal or the like, a data signal and, if appropriate, other regulating signals, or this can also advantageously be effected in a unit connected downstream of the evaluation unit. A detector unit generally has a plurality of detector elements, usually a four-quadrant detector comprising four detector elements and serving for signal acquisition and focus regulation, as well as two to four further detector elements serving for tracking and, if appropriate, focusing. The individual detector elements of the detector unit are connected to the evaluation unit. According to the prior art, this is realized by the detector elements each being connected to the evaluation unit by means of a line assigned to an individual detector element. The invention provides for a respective detector element or group of detector elements of a first detector unit and of a second detector unit to be connected to a single line leading from the scanning unit to the evaluation unit. It likewise lies within the scope of the invention to connect parts of a detector unit, that is to say a plurality of detector elements, to the evaluation unit after they have been combined by means of a common line. When a plurality of detector units are present, provision is made for connecting three, four or correspondingly more detector elements of different detector units to a single line. It likewise lies within the scope of the invention for the detector unit to have only a single detector element, which, with a detector element of another detector unit, has a common line to the evaluation unit. Such a single detector element is, for example, a monitor diode for monitoring the laser power, for ascertaining whether a recording medium, if appropriate of specific dimensions, has been inserted into the device, or the like. In this case, too, the invention enables an advantageous reduction in the number of lines required. Only partly combining detector elements of different detector units onto a single line and separately leading other detector elements via a respective dedicated line also lies within the scope of the invention. Since the detector units are not generally used simultaneously, rather each detector unit is used for different operating states, for example different types of recording media, in general only one of the detector units generates relatively large output signals. Depending on which detector unit is used, the signals generated by the other detector unit or units are so small that an interfering influence does not occur. Therefore, only a defined signal originating from the respectively active detector unit is then communicated via the respective individual line.

Provision is advantageously made of changeover means for assigning in each case one of the detector elements connected to a line. This has the advantage that interference signals that may arise due to the incidence of light on the respectively inactive detector unit can be effectively eliminated. In the simplest case, a changeover switch is provided for this purpose, by means of which the line can be connected to a respective detector element.

According to another aspect of the invention, it is provided that provision is made of a changeover means for the disconnection of detector element and evaluation unit. In this case, it is perfectly possible for a dedicated line to the evaluation unit to be available to each detector element. An advantage of this solution lies in the fact that signals which are possibly generated by the detector elements of a detector unit which is not to be evaluated are not forwarded to the evaluation unit. Possible interfering influences, for example due to crosstalk, are avoided in this way. Devices for equalizing or compensating for such interfering influences are not necessary. The changeover means is advantageously arranged on the detector unit in order to eliminate interfering influences as near as possible to their source. In this case, too, it is advantageously possible to disconnect only specific detector elements from the evaluation unit, while others remain connected to the evaluation unit without exerting a negative influence on the operation of the device.

According to the invention, the changeover means has switching elements arranged on the detector unit. This has the advantage that a changeover switch separate from the detector units is not necessary. The changeover means integrated on the or in the detector unit results in a further reduction of components. The switching element or elements effect a changeover of the outputs of the detector unit to high impedance, with the result that interference signals caused by light falling onto the corresponding detector elements have no influence on the respective outputs. The concrete configuration of the switching elements is in this case effected in a manner which is familiar to a person skilled in the art.

The invention further provides for the changeover means to have a switching signal input. This has the advantage that the changeover is controlled externally, advantageously by the evaluation unit. Each detector unit has a corresponding input, with the result that, for example for test purposes, the two detector units can also be connected simultaneously to the respective line or disconnected therefrom.

The switching signal input is advantageously identical to a further input of the detector unit. This has the advantage that an additional line for the switching signal is not necessary. The further input is, for example, an input which is provided for other switching or control signals. As an alternative to this, the further input is any other desired input of the detector unit onto which a corresponding switching signal can be impressed without its actual function being impaired.

According to the invention, the further input is a reference voltage input of the detector unit. This has the advantage that an additional input is not necessary since a reference voltage input for photodetectors is generally necessary in order to be able to generate a defined output signal. A defined output signal of this type is emitted by the detector unit when no light falls onto the detector areas. The evaluation unit usually outputs this reference voltage to the detector in order to ensure a common reference point for the so-called dark level. According to the invention, a switching signal is alternatively made available by this output of the evaluation unit for switching off the detector which is respectively not to be evaluated.

The invention provides for the switching signal input to be connected to a comparator unit. This has the advantage that a changeover signal can be evaluated in a simple manner. The comparator unit ascertains deviations of the input signal of the switching signal input and initiates a changeover when the signal level lies outside a specific range, for example when a specific threshold value is exceeded or undershot. The comparator unit advantageously has a window comparator which, in the case of the reference voltage, detects deviations of, for example, ±10% from the normal value. The comparator unit is connected downstream of the specific switching signal input or, if another input is used, downstream thereof.

The device according to the invention is advantageously a device which can read from and/or write to not only optical recording media which correspond to a CD standard but also those which correspond to a DVD standard.

The invention provides for light of different wavelengths to be used for reading from and/or writing to the optical recording medium, in particular in dependence on the type and/or the optical properties of the recording medium respectively used.

An inventive method for reading from and/or writing to optical recording media is specified in the method claim.

Further advantages of the invention emerge from the following description of an exemplary embodiment. In this case:

DETAILED DESCRIPTION OF PREFERED EMBODIMENTS

Figure 1:
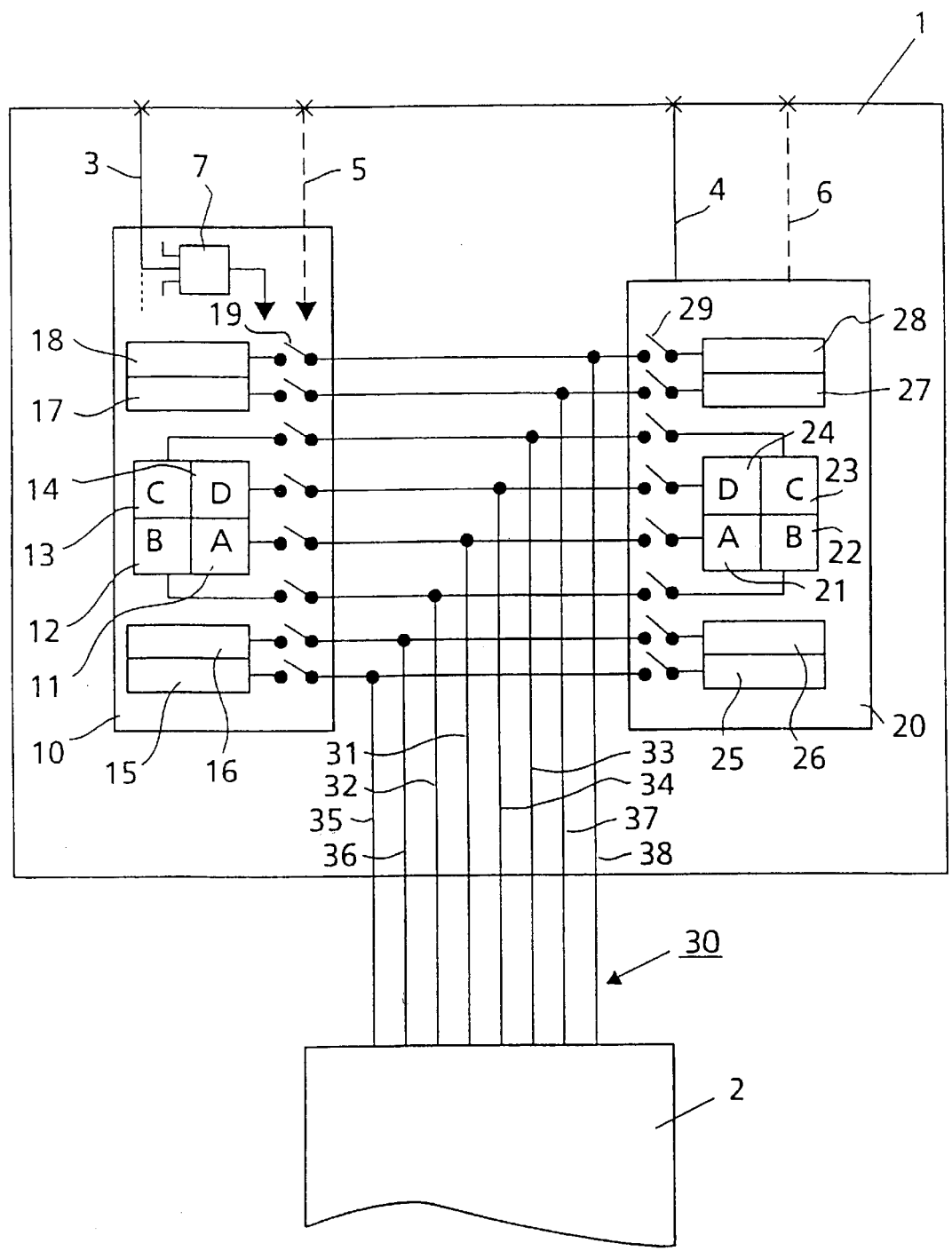
FIG. 1 shows scanning unit and evaluation unit of a device according to the invention, in a diagrammatical illustration.

FIG. 1 diagrammatically illustrates the scanning unit 1 and the evaluation unit 2 of a device according to the invention. Further elements of a device of this type are known to a person skilled in the art and, therefore, are not explained in any detail here. The scanning unit 1 has a first detector unit 10 and a second detector unit 20. Each of the detector units 10, 20 has a four-quadrant detector formed from four detector elements 11, 12, 13, 14 and 21, 22, 23, 24, respectively, and also has further detector elements 15–18 and 25–28, respectively. Each of the detector elements 11–18 and 21–28 can be connected by means of a switching element 19 and 29, respectively, to a line 31–38 assigned to it. The lines 31–38 are combined, if appropriate, with further lines to form a flexible multi-core line 30 and routed to the evaluation unit 2. Further lines arranged in the multi-core line 30 lead to reference voltage inputs 3, 4 of the detector units 10, 20.

According to a first refinement of the invention, switching signal inputs 5 and 6 are provided whose input signal serves to switch the switching elements 19 and 29, respectively, of the detector units 10 and 20, respectively. These inputs are illustrated by dashed lines in the exemplary embodiment. According to a further refinement of the invention, the reference voltage input 3 and 4, respectively, is connected to a window comparator 7, which is represented only for the detector unit 10 in FIG. 1, for the sake of simplicity. The window comparator 7 compares the level of the reference voltage applied to the reference voltage input 3 with an upper and a lower threshold value, and switches the switching elements 19 when the level of the reference voltage lies outside the range defined by the threshold values.

By means of the switching elements 19 and 29, the respectively unused detector unit 10 or 20 is disconnected from the lines 31–38, with the result that the evaluation unit 2 is connected to the detector elements 11–18 or 21–29 of a single detector unit 10 or 20. The switching elements 19 and 29 are illustrated as switches for the sake of simplicity, but may also be suitably designed in another way as long as they enable the respective detector unit 10 or 20 to be switched to an inactive state, for example a state of high impedance. Consequently, the lines 31–38 are jointly used by the detector elements 11–18 and 21–28, the switching elements 19 and 29 respectively ensuring that each line 31–38 has applied to it the signal only of one respective detector element 11–18 or 21–28.

In order to switch the switching elements 19–29, in accordance with the first refinement, a switching signal is output, for example by the evaluation unit 2, to a respective switching signal input 5 or 6 of the respective detector unit 10 or 20. According to the second refinement of the invention, the reference voltage which is applied to the respective reference voltage input 3 or 4 and generally assumes a value of 2.5 volts in a 5-volt system is set by the evaluation unit 2 to a value far removed from the normal value. Suitable values for this are 0 volts or 5 volts, that is to say the maximum voltage of the system. In the exemplary embodiment, a window comparator 7 is provided whose threshold values are 2 volts and 3 volts, with the result that a variation of the reference voltage in the range of 2–3 volts is tolerated, while larger deviations serve as a switching signal for switching the switching elements 19 to a state of high impedance. The detector unit 10 is switched off in this case, in the so-called "disable state".

In the exemplary embodiment, it is specified that detector elements which respectively correspond to one another, for example the detector elements 11–14 and 21–24 indicated by the letters A to D, in each case have common lines 31–34. However, it likewise lies within the scope of the invention for detector elements of different functions to be connected to the evaluation unit in a manner affording the capability of changeover by means of a common line. In this case, these detector elements of different functions can be arranged either on different detector units or on a single detector unit. In the latter case, the term detector unit corresponds to the not necessarily spatially discernible combination of detector elements which are evaluated jointly, that is to say which are simultaneously in a so-called "enable state". For example, one detector unit is formed from the detector elements 11–14, 16 and 17, while the other detector unit is formed from the detector elements 15–18. These "virtual" detector units are then likewise not both in operation simultaneously, they are not both evaluated simultaneously, rather they are provided for different recording media and/or different operating states of the device. The switching elements 19 are designed correspondingly.

What is claimed is:

1. A device for reading from or writing to optical recording media, said device comprising:
   a scanning unit, which is equipped with at least two detector units, each said detector unit having at least one detector element; and
   an evaluation unit coupled to said scanning unit;
   said detector elements and said evaluation unit being connected to one another and wherein:
   detector elements of said at least two detector units are connected to the evaluation unit using common conductors.

2. A device according to claim 1, characterized in that provision is made of a changeover means for inactivating respective unused detector elements.

3. A device according to claim 2, characterized in that the changeover means has switching elements arranged on at least one of the detector units.

4. A device according to claim 2, characterized in that the changeover means has a switching signal input.

5. A device according to claim 4, characterized in that the switching signal input is identical to a further input of one of the detector units, the further input being otherwise used for a different purpose.

6. A device according to claim 5, characterized in that the further input is a reference voltage input.

7. A device according to claim 4, characterized in that the switching signal input is connected to a comparator unit for comparing the input signal with a predetermined signal and emitting a switching signal based on the result of the comparison.

8. A device according to claim 1, characterized in that two detector units are provided, and one of them is suitable for recording media corresponding to a DVD and one of them is suitable for recording media corresponding to a CD.

9. A device according to claim 1, characterized in that a plurality of detector units are provided which are suitable for in each case a specific wavelength used for read-out and/or recording.

* * * * *